United States Patent
Sato et al.

(10) Patent No.: US 7,407,680 B2
(45) Date of Patent: Aug. 5, 2008

(54) METHOD FOR MANUFACTURING VEGETABLE JUICE AND THE LIKE WITH DECREASED NITRATE IONS

(75) Inventors: Takashi Sato, Shizuoka (JP); Yasuhiko Ikegawa, Shizuoka (JP); Takanobu Takihara, Shizuoka (JP)

(73) Assignee: ITO EN, Ltd., Tokyo (JP)

( * ) Notice: Subject to any disclaimer, the term of this patent is extended or adjusted under 35 U.S.C. 154(b) by 510 days.

(21) Appl. No.: 10/941,109

(22) Filed: Sep. 15, 2004

(65) Prior Publication Data
US 2005/0074522 A1    Apr. 7, 2005

(30) Foreign Application Priority Data
Oct. 1, 2003    (JP)    ............. P2003-343706

(51) Int. Cl.
*A23L 1/015* (2006.01)
*A23L 1/025* (2006.01)
(52) U.S. Cl. .............. 426/518; 426/478; 426/481; 426/506; 426/508; 426/599; 426/615
(58) Field of Classification Search ................ 426/615, 426/478, 481, 506, 508, 518, 599
See application file for complete search history.

(56) References Cited

U.S. PATENT DOCUMENTS 4,636,399 A * 1/1987 Nguyen et al. ............... 426/629

FOREIGN PATENT DOCUMENTS

| JP | 05-007471 A | 1/1993 |
| JP | 10-229858 A | 9/1998 |
| JP | 11-290041 A | 10/1999 |
| JP | 2001-275602 A | 10/2001 |
| JP | 2001-293380 A | 10/2001 |
| SU | 1790901 A1 * | 12/1990 |

OTHER PUBLICATIONS

Takahiro Inakuma, Hirohisa Tatsuzawa and Yukio Ishiguro: "Manufacturing Process of Carrot Juice using a Fresh Squeezer", Journal of the Japanese Society for Food Science and Technology, vol. 43, No. 1, 85-90 (1996), (Nippon Shokuhin Kagaku Kogaku Kaishi).
Kagome Lecture—Development of carrot juice and technical aspect of that development (Aug. 6-7 2003, Japan Society for Food Engineering (Shiga)).

* cited by examiner

*Primary Examiner*—Helen Pratt
(74) *Attorney, Agent, or Firm*—Sughrue Mion, PLLC (57) ABSTRACT

A carrot is sliced in the longitudinal direction in such a way that the slice surface passes through the core portion, the sliced carrot fragment is blanched and the blanched carrot fragment is extracted to obtain a vegetable extract, so as to manufacture a vegetable extract. By slicing the carrot in the longitudinal direction so as to pass through the core portion, a larger area of the core portion towards which the presence of nitrate ions is biased can be exposed, the contact area between the core portion and the blanching water can be increased and more nitrate ions can be eluted and removed at blanching time.

4 Claims, 7 Drawing Sheets

METHOD FOR MANUFACTURING VEGETABLE JUICE AND THE LIKE WITH DECREASED NITRATE IONS

BACKGROUND OF THE INVENTION

1. Field of the Invention

The present invention relates to a method for manufacturing vegetable juice and the like with decreased nitrate ions. More specifically, it relates to the method for manufacturing vegetable juice and the like wherein the nitrate ions are efficiently decreased in vegetable juice, vegetable extract, vegetable extract concentrate and the like, having carrot as ingredient.

2. Related Art Statement

Plants absorb nitrate nitrogen as nutrient to make amino acids and proteins. As such, nitrate nitrogen is a constituent that is indispensable for the plant, but at the same time, if nitrogen is supplied excessively in amounts that are more than the quantity necessary for growth, or if the balance with other nutrients such as phosphorus, potassium, calcium and magnesium collapses, or if photosynthesis does not proceed due to insufficient illumination, the entirety of the nitrate nitrogen that was absorbed is not metabolized into proteins and amino acids, and remains inside the body of the plant as is, in the form of nitrate nitrogen (nitrate ion).

When the nitrate nitrogen (nitrate ion) that remains inside the plant body is ingested inside the body of a human, a portion thereof is changed into nitrite ion inside the mouth and binds to amine to become "nitrosamine", a carcinogenic substance. Furthermore in the blood, it binds to hemoglobin, which transports oxygen, to become "nitroso hemoglobin", which is said to be a cause for triggering asphyxiation. In addition, nitrate nitrogen is also known as a causal substance of blood diseases in infants, such that decreasing nitrate ions in vegetables, vegetable juice and the like is desired.

The method of boiling the plant to achieve the decrease is well known as a method for decreasing nitrate ions. Boiling is said to allow the removal of approximately 30 to 45% of nitrate ions in case of leaf and stem vegetables and approximately 20% in case of root vegetables.

A thorough precaution is taken regarding the control of nitrate ion concentration also in the field of vegetable juice manufacturing, such that vegetable ingredients with as low as possible nitrate ion concentration are selected and used, or, methods have been adopted whereby the vegetables are blanched (boiled), or nitrate ions are adsorbed and eliminated by ion exchange treatment (see Japanese Patent Application Laid-Open No. 11-290041 and Japanese Patent Application Laid-Open No. 10-229858).

SUMMARY OF THE INVENTION

The present invention proposes a method for manufacturing carrot extract provided with the steps of slicing a carrot in the longitudinal direction in such a way that the slice surface passes through the core portion, blanching the sliced carrot fragment and subjecting the blanched carrot fragment to extraction to obtain a carrot extract, as well as a method for manufacturing vegetable juice having this carrot extract as ingredient.

In addition, the present invention proposes a method for manufacturing carrot puree provided with the steps of slicing a carrot in the longitudinal direction in such a way that the slice surface passes through the core portion, blanching the sliced carrot fragment and grinding the blanched carrot fragment to obtain carrot puree.

In the present invention, "slicing a carrot in the longitudinal direction in such a way that the slice surface passes through the core portion" means to slice a carrot in the longitudinal direction thereof so as to expose the core portion on the slice surface. Since the presence of nitrate ions that are contained in the carrot is remarkably biased towards the core portion, slicing in this manner prior to blanching allows the contact area between the core portion and the blanching water to be increased, such that at the time of blanching, far more nitrate ions can be eluted and eliminated.

In the above-mentioned manufacturing method, alternatively to slicing the carrot in the longitudinal direction in such a way that the slice surface passes through the core portion, the core portion in its entirety or a portion thereof may be excised from the carrot main body portion and the main body portion remaining after excision may be subjected to the blanching step. That is to say, the core portion towards which the presence of nitrate ions is biased may be physically removed.

Furthermore, alternatively to slicing the carrot in the longitudinal direction in such a way that the slice surface passes through the core portion, an incision may be practiced in the longitudinal direction so as to penetrate into the core portion and the incised carrot or carrot fragment may be subjected to the blanching step. This allows the core portion towards which the presence of nitrate ions is biased to be more in contact with the blanching water, such that at the time of blanching, many more nitrate ions can be eluted and eliminated.

The carrot extract obtained as described above may be concentrated into a carrot extract concentrate, or the carrot extract concentrate that has been concentrated may be diluted with water and the like to manufacture a carrot juice or vegetable juice. In addition, it may be mixed as a juice ingredient without concentrating to manufacture carrot juice or vegetable juice.

In either case, according to the present invention, nitrate ions in vegetable juice, carrot extract, carrot extract concentrate or carrot puree can be efficiently decreased.

In the present invention, "vegetable juice" is a juice (including extracts and beverages) having carrot as one of the main ingredients. In addition to carrot juices having only extract from carrot as ingredient, vegetable juices comprising mixed extracts from vegetables other than carrot and from fruits as ingredients are included.

In addition, in the present invention, "core portion" means, after slicing into rings, the central portion whose color is different from the peripheral flesh portion. Botanically, a carrot results from a hypertrophy of the hypocotyl and of the upper portion of the radicle, the core portion thereof resulting from a hypertrophy of the xylem parenchyma, and the peripheral flesh portion thereof resulting from a hypertrophy predominantly of the phloem parenchyma.

In addition, "core portion center" means the central portion of the core portion, and is a central portion of on the order of 5 mm diameter in the vicinity of the line joining the tip and the central portion of the upper portion, that is the root of the leaves.

DESCRIPTION OF THE PREFERRED EMBODIMENT

In the following, a method for manufacturing carrot juice according to a mode of the present invention will be explained; however, the manufacturing method of the present invention is not limited to the method described below.

Herein, a mode for manufacturing carrot juice through a step of washing and decorticating a raw carrot (washing and decorticating step), a step of slicing the carrot in the longitudinal direction in such a way that the slice surface passes through the core portion (blanching pretreatment step), a step of blanching a sliced carrot fragment (blanching step), a step of subjecting a blanched carrot fragment to extraction to obtain a carrot extract (extraction step), a step of adjusting the flavor, the odor, the pH and the like (concoction step) and a step of sterilizing the concocted carrot extract (sterilization step).

(Washing and Decorticating Step)

It is preferred that the peeled carrot be treated for enzyme inactivation by blanching while not less than one day, particularly not less than 12 hours have elapsed after decortication. If one day or more has elapsed in the peeled state, preventing occurrence of coagulation becomes difficult, even if thoroughly blanching for instance up to a product temperature of 90° C.

(Blanching Pretreatment Step)

In the present step, the carrot is sliced in the longitudinal direction in such a way that the slice surface passes through the core portion so as to expose the core portion on the slice surface of the carrot after slicing.

Figure 1:
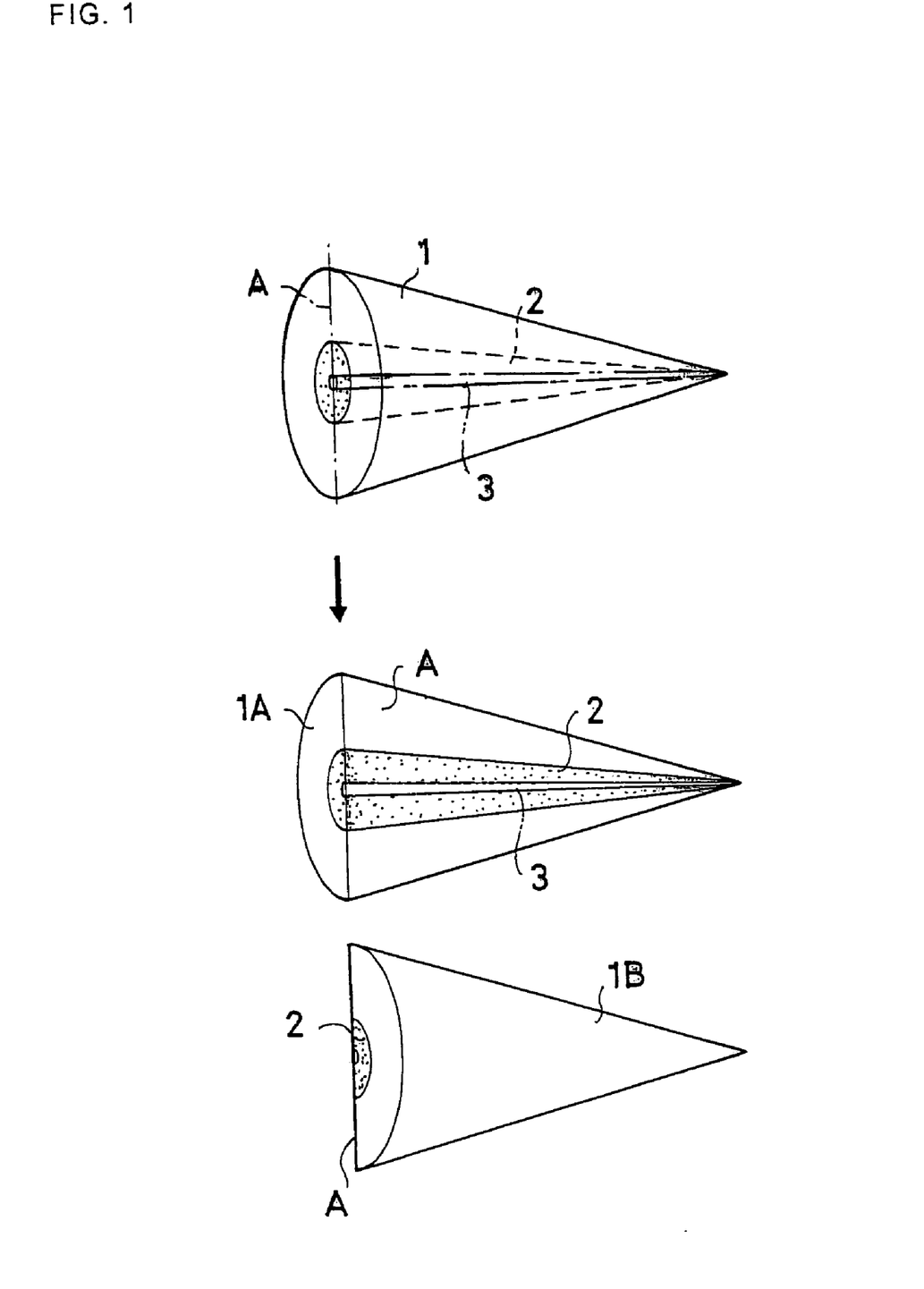
FIG. 1 sequentially shows a carrot slicing method according to one exemplary mode of the present invention, the front face of this Fig. being shown as a virtual cross-section so as to easily show the sliced state.

In order to slice in the longitudinal direction in such a way that the slice surface passes through the core portion of the carrot, it is suitable to slice in such a way that a slice surface A passes through a core portion 2 of a carrot 1 and particularly preferably through a core portion center 3 of the carrot, for instance as shown in FIG. 1. In other words, it is suitable to slice in such a way that the slice surface A enters into the core portion 2 of the carrot 1 in the same orientation as the core portion 2.

When slicing in this way such that the slice surface A passes through the core portion 2 of the carrot 1, the core portion 2 towards which the presence of nitrate ions is biased can be more exposed on the slice surface compared to when slicing into rings (slice surface is in an orientation that is orthogonal to the longitudinal direction), the contact area with the blanching water is increased, allowing the amount of nitrate ions eluted into the blanching water to be increased. Now, if slicing is in the longitudinal direction (vertical cut) in such a way that the slice surface passes through the core portion center 3, the amount of nitrate ions eluted can be further increased.

Figure 4:
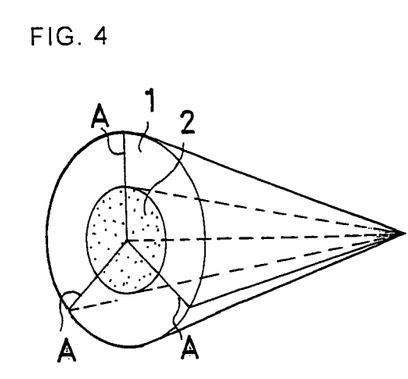
FIG. 4 shows another example of carrot slicing method, which was carried out in the test as explained below, the front face of this Fig. being shown as a virtual cross-section so as to easily show the sliced state.
Figure 5:
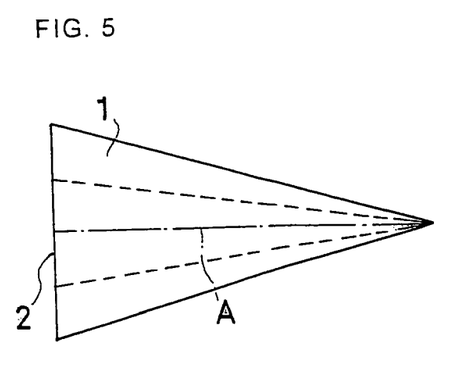
FIG. 5 is a side view of the carrot shown in FIG. 4.

In so doing, as a mode of slicing in the longitudinal direction in such a way that the slice surface passes through the core portion of the carrot, slicing may be in such a way that the slice surface A passes through the core portion 2 of the carrot 1 and particularly preferably through the core portion center 3 of the carrot for partitioning into two carrot fragments 1A and 1B as shown in FIG. 1, or, as shown in FIG. 4 and FIG. 5, slicing may be in such a way that the slice surface A passes through the core portion 2 of the carrot 1 and particularly preferably through the core portion center 3 of the carrot for tripartitioning, or, partitioning may be into a greater number.

In addition, a carrot fragment that was obtained by slicing once may be further sliced finely in such a way that the slice surface A passes through the core portion 2 of the carrot 1 and particularly preferably through the core portion center 3 of the carrot.

Figure 12:
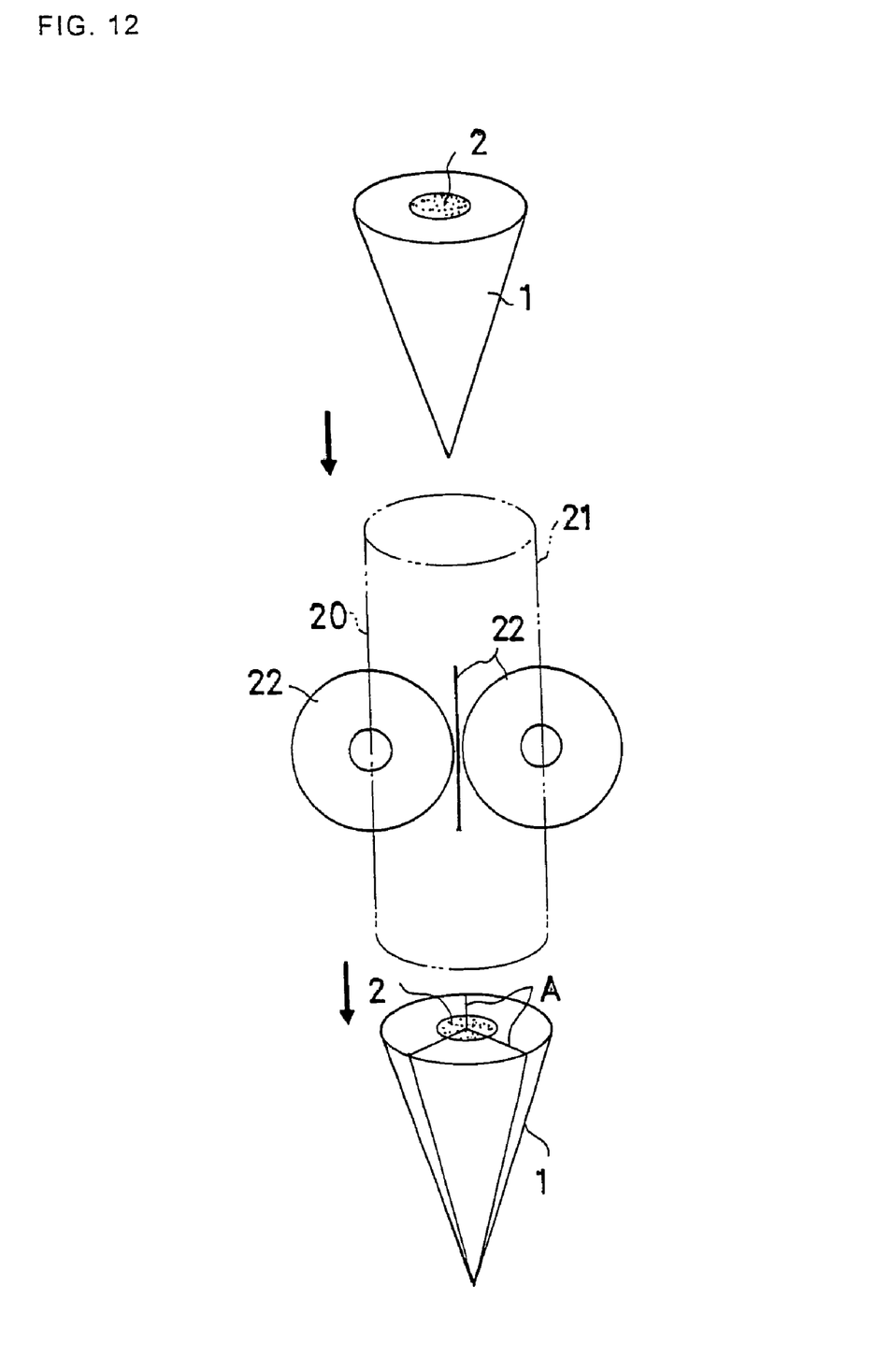
FIG. 12 is a schematic drawing showing the method for slicing carrot as shown in FIG. 4 and FIG. 5.

In order to slice in the longitudinal direction in such a way that the slice surface passes through the core portion of the carrot (for instance when tripartitioning), for instance, slicing may be by using a slicing device 20 comprising, inside a cylindrical pipe 21 through which the carrot 1 is pushed, three rotating cutters 22 that are positioned radially from the central portion of the pipe 21 in such a way that they respectively rotate longitudinally, as shown in FIG. 12. However, the method is not limited to this.

In addition, the entirety or a portion of the core portion 2 of the carrot 1 may be excised and the main body portion remaining after excision may be blanched. If the core portion 2 towards which the presence of nitrate ions is biased is physically excised in this way, a decrease in nitrate ions can be devised.

Figure 13:
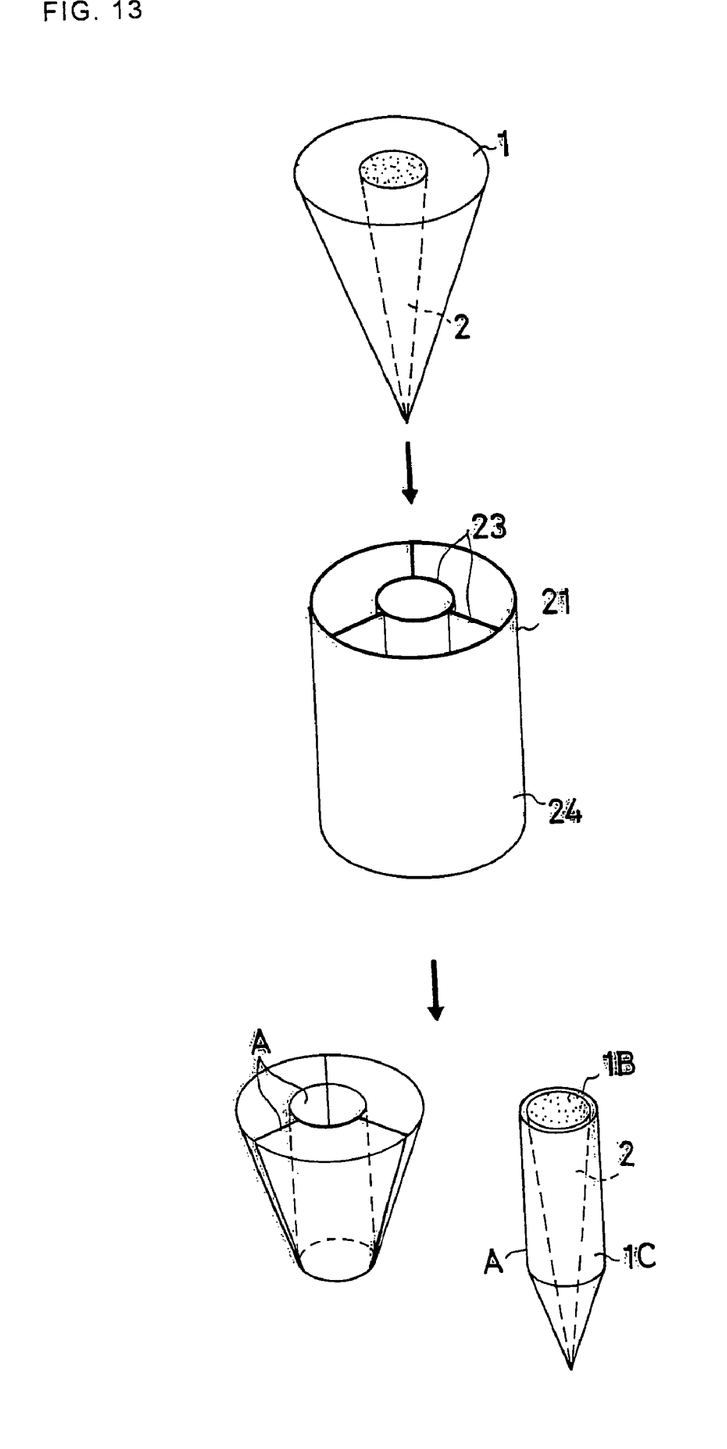
FIG. 13 is a schematic drawing showing a method for excising the core portion of the carrot in its entirety.

In this case, in order to excise the core portion 2 of the carrot 1 in its entirety, it is suitable to excise the portion 1B, which contains the core portion 2, from the main body portion, into the shape of the tip of a pencil, using a slicing device 24 comprising, positioned inside the cylindrical pipe 21 through which the carrot 1 is pushed, a cylindrical cutter 23 comprising a diameter corresponding to the maximum diameter of the core portion 2, for instance as shown in FIG. 13. However, the method is not limited to this.

In so doing, the portion that contains the core portion 2 can be further excised from the excised portion 1B, and returned to the main body portion remaining after excision, as necessary. In addition, the excised portion may be blanched, extracted and returned to the system for the main body portion.

Figure 14:
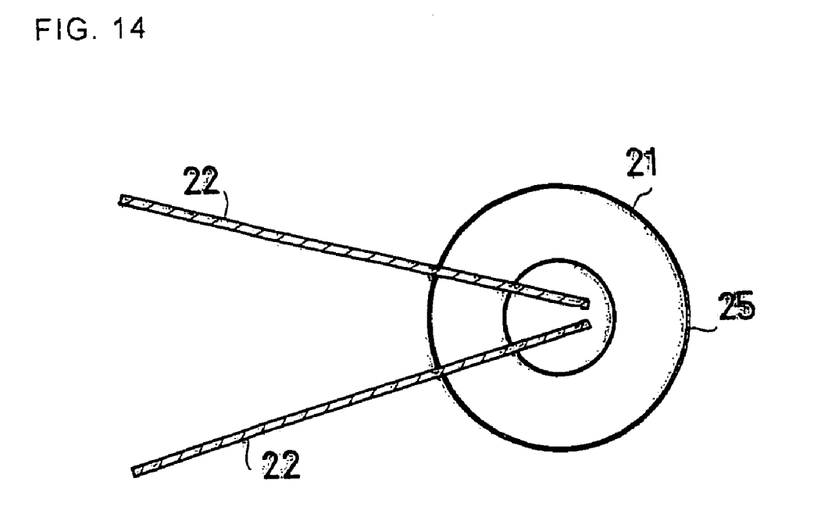
FIG. 14 is a partial cross-sectional top view showing a device for excising a portion of the core portion of the carrot.
Figure 15:
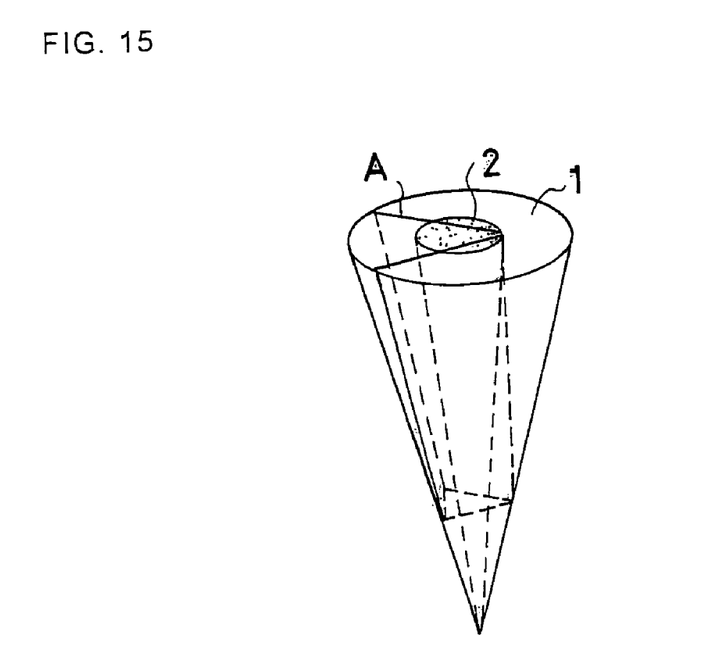
FIG. 15 is a perspective view showing the state of the carrot that is to be sliced by excising a portion of the core portion of the carrot as in FIG. 14.

On the other hand, in order to excise a portion of the core portion 2 of the carrot 1, it is possible to excise the portion containing the core portion 2, from the main body portion, into the shape of a fan, as shown in FIG. 15, using a slicing device 25 comprising, inside the cylindrical pipe 21 through which the carrot 1 is pushed, two rotating cutters 22 that are respectively positioned so as to rotate longitudinally, in such a way that the central portion of the pipe 21 becomes a scissor angle, for instance as shown in FIG. 14.

Also in this case, the portion containing the core portion 2 can be further excised from the excised portion, and returned to the main body portion remaining after excision, as necessary. In addition, the excised portion may also be blanched, extracted and returned to the system for the main body portion.

Figure 10:
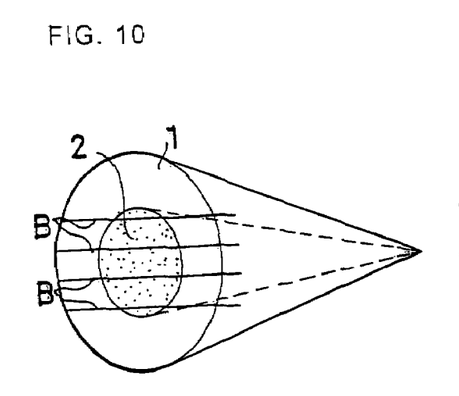
FIG. 10 shows another example of carrot slicing method, which was carried out in the test as explained below, the front face of this Fig. being shown as a virtual cross-section so as to easily show the sliced state.
Figure 11:
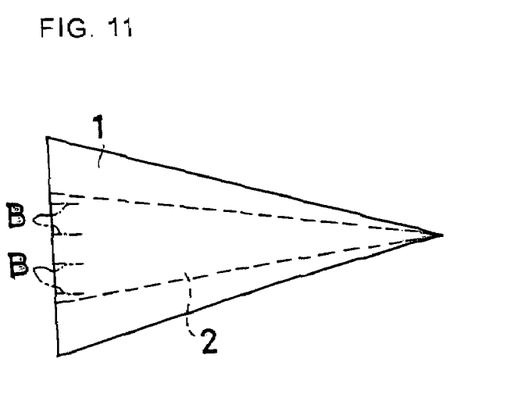
FIG. 11 is a side view of the carrot shown in FIG. 10.

Furthermore, an incision B may be practiced in the longitudinal direction so as to penetrate inside the core portion 2 as shown in FIG. 10 and FIG. 11, and the carrot in which the incision B was practiced is blanched.

In so doing, the number of incision B is not limited in particular confinement; however, it is preferred that the depth of each incision B is such that not less than 20%, preferably not less than 30% and particularly preferably not less than 40% of the incision face thereof penetrates inside the core portion 2.

(Blanching Step)

For the blanching method, blanching until the product temperature reaches 60 to 100° C. in hot water at 60 to 100° C. is sufficient; however, in order to effectively decrease the nitrate ion concentration, blanching in water at not less than 70° C. and particularly preferably at 70 to 100° C. until the temperature inside the carrot fragment reaches 70 to 100° C. to inactivate the enzymes is preferred.

The enzyme inactivation treatment is a treatment that inactivates the pectin esterase activity completely, and brings the survival rate of the pectinase activity to 60% and below in the carrot. There is a possibility for coagulation to occur if the pectin esterase activity is not completely inactivated, or if the survival rate of the pectinase activity is not 60% or below.

As a treatment method for inactivation of enzyme so as to inactivate the pectin esterase activity completely, and bring the survival rate of the pectinase activity to 60% and below in the carrot, for instance, blanching the carrot in water at 70 to 100° C. until the internal temperature inside the carrot fragment reaches 70 to 100° C. is preferred. In such a method, if the temperature of the water for carrying out blanching is lower then 70° C., coagulation occurs due to the action of pectin degrading enzymes.

It is believed that in order to prevent agglutination, it is necessary to inactivate completely the pectin esterase activity while decreasing the pectinase activity to 60% and below.

(Extraction Step)

The extraction method may be extracting by an extractor such as a two-axis rotation-type extruder, subjecting broken or ground carrot fragments to extraction by funnel filtration, then to centrifugal separation (3000 rpm, 10 minutes) to obtain carrot extract, or extracting by other methods.

(Concoction Step)

Flavor, odor, concentration, pH and the like are adjusted in the present step. It suffices to perform concoction in the same way as for a conventional carrot juice. If pH is to be adjusted, it suffices to adjust the pH in the acidic region, preferably pH 4.2, for instance with a citric acid solution and the like.

In case a vegetable juice is to be manufactured, it suffices to mix solutions extracted from other vegetables and fruits in the present step.

(Sterilization Step)

For sterilization it suffices to perform conventional sterilization treatment according to the container to be filled.

(Puree Step)

In case giving a texture to the juice is desired, and the like, the carrot fragment that underwent enzyme inactivation by blanching may be broken or ground and turned into carrot puree, the carrot puree as is, or subjected to a prescribed treatment and a prescribed amount thereof may be added to carrot extract, in a concoction step and the like. In so doing, it is preferred to adjust suitably the particle size for grinding.

The method of the present invention is also applicable to root crops containing nitrate ions, in addition to carrot.

EXAMPLE

In the following, the present invention will be described based on examples and comparative examples.

(Test To Determine The Biased Presence Of Nitrate Ion Concentration)

Figure 16:
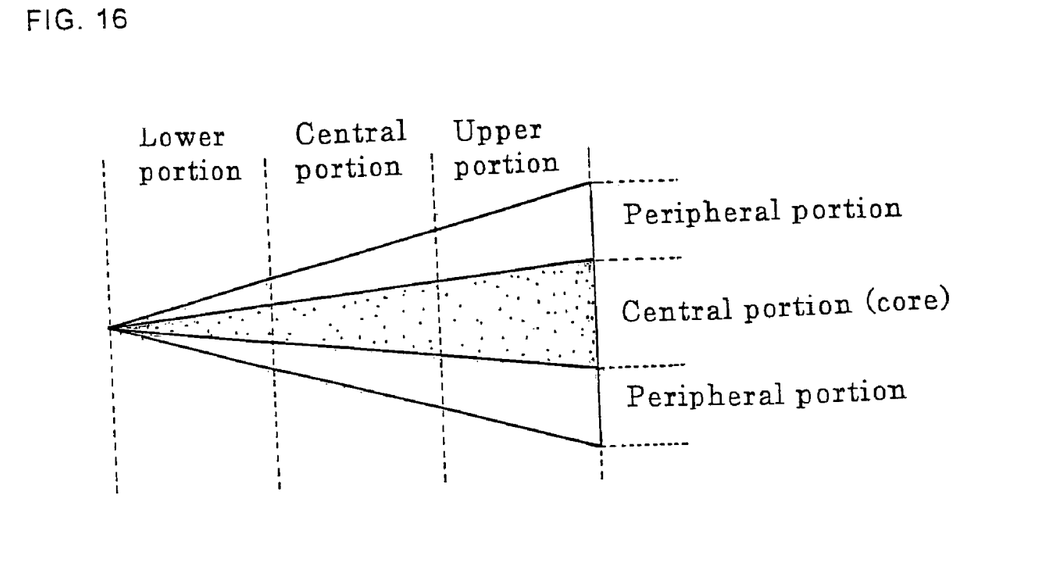
FIG. 16 shows a cross section of a carrot in order to show the location of excision and extraction of each sample in the test to determine the biased presence of nitrate ion concentration described below.

In a peeled carrot (cultivar: Koyo 2), samples were excised and removed from the six sites shown in FIG. 16, the respective weight, Brix (°) (PR-100, manufactured by ATAGO) and nitrate ion concentration (RQflex, manufactured by MERCK) were measured, and the results are shown in Table 1-Table 3. In so doing, the distinction between the central portion (core) and the peripheral portion was by assessing the central portion with a different color than the peripheral portion as the core portion.

TABLE 1

|  |  | Lower portion | Middle portion | Upper portion | Total |
|---|---|---|---|---|---|
| Weight (g) | Central portion (core) | 2.4 | 9.7 | 23.6 | 35.7 |
|  | Peripheral portion | 19.8 | 54.6 | 102.0 | 176.4 |

TABLE 2

|  |  | Lower portion | Middle portion | Upper portion | Average |
|---|---|---|---|---|---|
| BRIX (°) | Central portion (core) | 7.1 | 6.7 | 6.6 | 6.8 |
|  | Peripheral portion | 8.2 | 8.2 | 8.2 | 8.2 |

TABLE 3

|  |  | Lower portion | Middle portion | Upper portion | Average |
|---|---|---|---|---|---|
| Nitrate ion concentration (ppm) | Central portion (core) | 328 | 865 | 1280 | 824 |
|  | Peripheral portion | 63 | 40 | 25 | 43 |

As a result thereof, it was revealed that the nitrate ion concentration of the core portion was remarkably high compared to the peripheral portion, with a biased presence of a total of approximately 70 to 80% of nitrate ion in the core portion.

In addition, when comparing the upper and the lower portions, it was revealed that the nitrate ion concentration in the core portion was higher in the upper portion; however, the nitrate ion concentration in the peripheral portion was higher in the lower portion.

(Method For Blanching Pretreatment And Quantity Of Nitric Acid Eluted)

Peeled raw carrots (cultivar: Koyo 2) were sliced according to three kinds of methods shown in FIG. 2 to FIG. 7, the sliced carrot fragments were blanched for 15 minutes with ion exchange water (blanching water) at 85° C. and the blanched carrot fragments were subjected to extraction with a commercially available juicer for household use.

Figure 2:
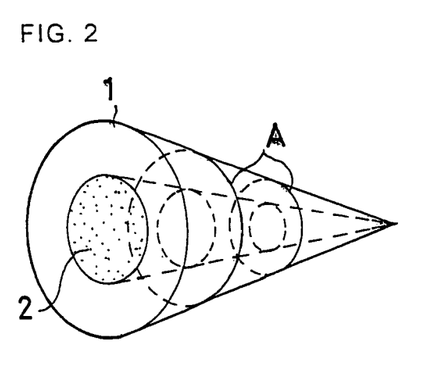
FIG. 2 shows one example of carrot slicing method, which was carried out in the test as explained below, the front face of this Figure being shown as a virtual cross-section so as to easily show the sliced state.
Figure 3:
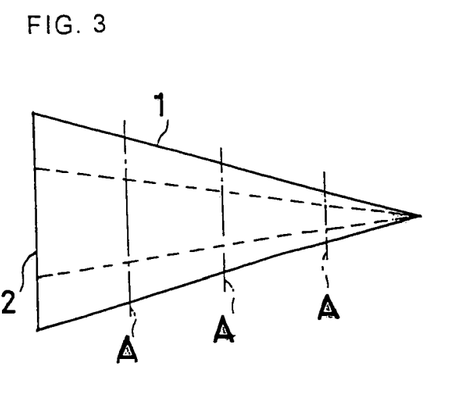
FIG. 3 is aside view of the carrot shown in FIG. 2.

Note that in the method of slicing into rings shown in FIG. 2 (FIG. 3), slicing was with an interval of 4 cm from the top of the carrot.

In addition, in the methods shown in FIG. 4 to FIG. 7, partition was performed equally with the core portion center of the carrot as the center.

The weight, Brix (PR-100, manufactured by ATAGO) and the nitrate ion concentration (RQflex, manufactured by MERCK) of the carrot fragments and blanching water were measured after blanching, and the rate of nitrate ion elution (%) and Brix loss (%) were calculated according to the formula given below. The results are shown in Table 4.

Figure 8:
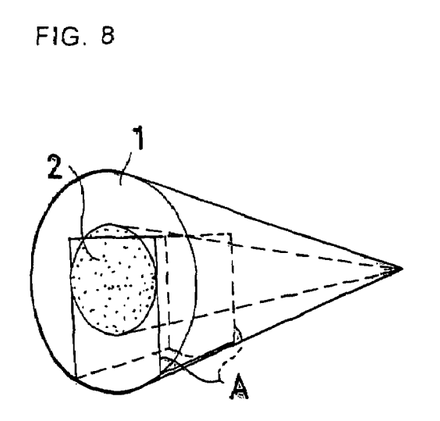
FIG. 8 shows another example of carrot slicing method, which was carried out in the test as explained below, the front face of this Fig. being shown as a virtual cross-section so as to easily show the sliced state.

In addition, peeled raw carrot (cultivar: Koyo 2) was subjected to excision as shown in FIG. 8 (FIG. 9), from the upper portion of the carrot centered on the core into a 2 cm×3 cm×5 cm angled column-shape, the carrot fragment remaining after excision was blanched for 15 minutes with ion exchange water (blanching water) at 85° C. and the blanched carrot fragment was subjected to extraction with a commercially available juicer for household use.

Figure 9:
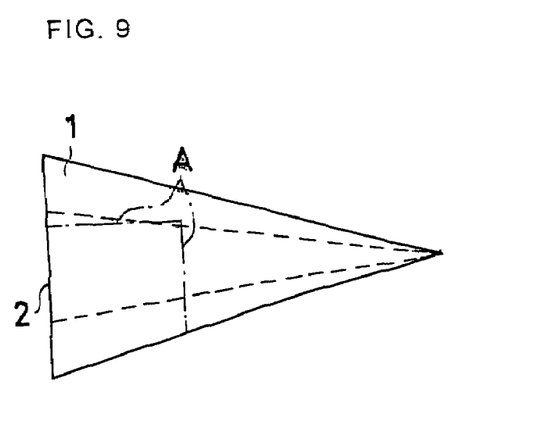
FIG. 9 is a side view of the carrot shown in FIG. 8.

In so doing, Brix (PR-100, manufactured by ATAGO) and the nitrate ion concentration (RQflex, manufactured by MERCK) were measured while measuring the weight of the excised portion, the carrot fragment, and blanching water was measured after blanching, and the rate of nitrate ion elution (%) and Brix loss (%) were calculated according to the formula given below. The results are shown in Table 4.

In addition, in a peeled raw carrot (cultivar: Koyo 2), four incisions of 5 cm deep and 2 mm wide were practiced throughout the entire width of the carrot, from the upper portion of the carrot so as to pass through the core portion, as shown in FIG. 10 (FIG. 11), this was blanched for 15 minutes with ion exchange water (blanching water) at 85° C. and the blanched carrot fragment was subjected to extraction with a commercially available juicer for household use.

In so doing, the weight, Brix (PR-100, manufactured by ATAGO) and the nitrate ion concentration (RQflex, manufactured by MERCK) of the carrot fragment, and blanching water were measured after blanching, and the rate of nitrate ion elution (%) and Brix loss (%) were calculated according to the formula given below. The results are shown in Table 4.

rate of nitrate ion elution (%)=(amount eluted in blanching water/total amount of components in crude carrot)×100 total amount of components in crude carrot=amount remaining in carrot after blanching+amount eluted in blanching water amount eluted in blanching water=blanching water Brix×blanching water weight amount remaining in carrot after blanching=nitrate ion concentration in carrot fragment after blanching× weight Brix loss (%)={(crude carrot Brix−carrot after blanching)/crude carrot Brix}×100

TABLE 4

Figure 6:
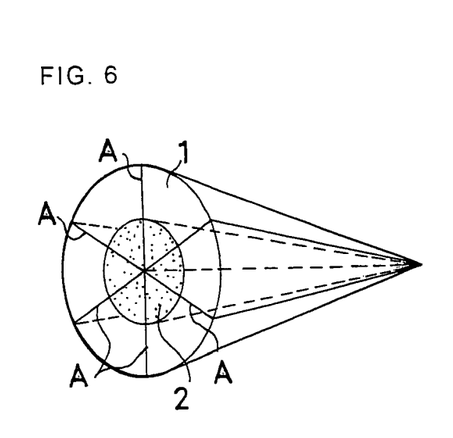
FIG. 6 shows another example of carrot slicing method, which was carried out in the test as explained below, the front face of this Fig. being shown as a virtual cross-section so as to easily show the sliced state.
Figure 7:
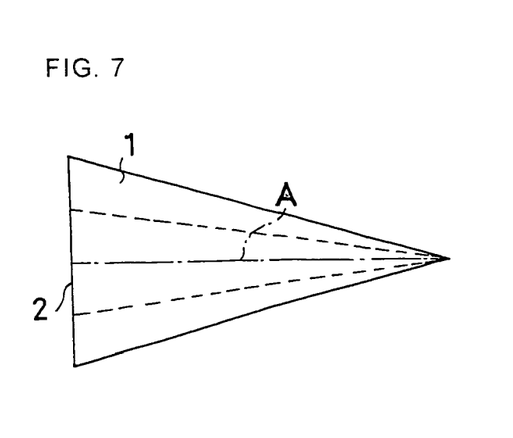
FIG. 7 is a side view of the carrot shown in FIG. 6.

| Slicing method | Rate of nitrate ion elution (%) | BRIX loss (%) | Weight loss (%) |
|---|---|---|---|
| FIG. 2 | 21.3 | 9.6 |  |
| FIG. 4 | 52.8 | 20.3 |  |
| FIG. 6 | 61.4 | 28.6 |  |
| FIG. 8 (main body portion) | 69.3 | 28.2 | 15.7 |
| FIG. 8 (excised portion) | 47.0 | 20.0 |  |
| FIG. 10 | 60.0 | 20.3 |  |

What is claimed is:

1. A method for manufacturing a carrot extract with decreased nitrate ion concentration, comprising:
    slicing a carrot in the longitudinal in such a way that an incision is practiced so as to penetrate inside but not through the core portion,
    blanching the carrot in which the incision was practiced, and
    subjecting the blanched carrot to extraction to obtain a carrot extract.

2. A method for manufacturing a vegetable juice with decreased nitrate ion concentration characterized by the mixing of the carrot extract obtained in claim 1 as a juice ingredient.

3. A method for manufacturing a carrot extract concentrate with decreased nitrate ion concentration characterized by concentrating the carrot extract obtained in claim 1.

4. A method for manufacturing a vegetable juice with decreased nitrate ion concentration characterized by the mixing of the carrot extract concentrate obtained in claim 3 as a juice ingredient.

* * * * *